(12) United States Patent
Balázs et al.

(10) Patent No.: US 7,462,230 B2
(45) Date of Patent: Dec. 9, 2008

(54) INK COMPOSITION FOR MARKING GLASS AND CERAMIC SURFACES

(75) Inventors: László Balázs, Budapest (HU); Ferenc Dudás, Budapest (HU); Zoltán Pilter, Nagykanizsa (JP)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 11/321,960

(22) Filed: Dec. 29, 2005

(65) Prior Publication Data

US 2007/0084379 A1    Apr. 19, 2007

(30) Foreign Application Priority Data

Oct. 14, 2005    (HU) .................................. 0500946

(51) Int. Cl.
*C09D 11/00*    (2006.01)

(52) U.S. Cl. .................................. 106/31.6; 106/31.86

(58) Field of Classification Search ................ 106/31.6, 106/31.86
See application file for complete search history.

(56) References Cited

U.S. PATENT DOCUMENTS

| 1,538,890 | A | | 5/1925 | Fredenburgh |
| 2,254,865 | A | | 9/1941 | Wilson |
| 5,616,417 | A | * | 4/1997 | Ryan ........................... 428/428 |
| 5,677,251 | A | * | 10/1997 | Sakoske ...................... 501/17 |

* cited by examiner

*Primary Examiner*—J. A. Lorengo
*Assistant Examiner*—Veronica Faison Gee
(74) *Attorney, Agent, or Firm*—Fay Sharpe LLP

(57) ABSTRACT

An ink composition for marking glass and ceramic surfaces, and for burning in said surfaces at an elevated temperature, the composition comprising the following components:
  35-55% by weight pigment,
  15-30% by weight lead-free frit,
  20-45% by weight vehicle material,
and the components constitute a total 100% by weight.

19 Claims, No Drawings

INK COMPOSITION FOR MARKING GLASS AND CERAMIC SURFACES

FIELD OF THE INVENTION

This invention relates to an ink composition for marking glass and ceramic surfaces. More particularly, this invention relates to a composition suitable for stamp pad ink material, which can be used for preparing markings on glass or ceramic surfaces.

BACKGROUND OF THE INVENTION

Marking, for example the name and logo of a manufacturer, a brand name or performance data of a product are generally indicated on products. Those that have glass or ceramic surfaces bear the markings on these surfaces. Such products are for example bulbs of light sources. Moreover labels, decorations and markings are also applied to the surface of household glass and ceramic goods as well as laboratory appliances.

The markings, labels and decorations can be manufactured by using ink materials that are stamped on the glass and ceramic surfaces, and then are burnt in so that the marking can be durable.

Several compositions for ink materials are known that are suitable for stamping and burning in, among others, on lamp bulbs. However, the known materials have lead content, which is undesirable.

From $1^{st}$ of Jul. 2006, preparations containing lead cannot be used for marking glass parts of light sources in the European market any more, as it is stated in the 2002/95/EC Directive of the European Parliament and the Council of Europe. This Directive restricts the lead content in different compositions, semi-finished and finished products drastically. Considering that the restriction is obligatory both for manufacturers and for distributors, products containing lead will not be manufactured or sold after the date mentioned above.

U.S. Pat. No. 1,538,890 discloses an ink composition for glass. This ink comprises an intimate mixture of about 70% by weight of silver oxide and about 30% by weight of lead borate, mixed in the proportion of about 65% by weight to about 35% by weight of glycerin. Due to the lead borate content of the ink composition, it does not meet the requirements of lead-free composition and thus is harmful to the environment.

U.S. Pat. No. 2,254,865 relates to ink and, more particularly, to ink, which may be applied to the surface of glass or other smooth material, to produce thereon a monogram, trademark or other indicia. The patented ink composition comprises about 73.7% by weight of glycerin. This considerable amount of vehicle material is disadvantageous.

Thus there is a particular need for an ink composition, which meets the requirements of the above referenced Directive and still has good stamping, burning in and lifetime properties.

SUMMARY OF THE INVENTION

In an exemplary embodiment of the invention, an ink composition for marking glass and ceramic surfaces, and for burning in said surfaces at an elevated temperature is provided. The ink composition comprises the following components:
  35-55% by weight pigment,
  15-30% by weight lead-free frit,
  20-45% by weight vehicle material,
and the components constitute a total 100% by weight.

The marking can be burnt in the surface at an elevated temperature, with the help of heat effect, for example with direct gas flame. This has an advantage that the regular lamp manufacturing lines do not require change for using this ink. Furthermore, such ink compositions are useful not only for marking glass bulbs in the lighting industry, but for decorative coatings and ornaments on the surface of glass and ceramic products. In addition, the proposed ink does not contain either lead or any other components, e.g. cadmium, mercury or hexavalent chromium restricted by the European Directive.

DETAILED DESCRIPTION OF THE INVENTION

The proposed ink composition relates to a stamp material, which is suitable for and durable during manufacturing and even during its further product lifetime. The coloring features have to be maintained even until the end of the product lifetime. At the same time, the components of the ink have to meet the requirement of lead-free composition.

The usual inks, capable of meeting the requirements mentioned before, comprise pigments as coloring material, frit as binding material, and vehicle material.

In an exemplary embodiment of the ink composition, the components are in the following ranges:
  35-55% by weight pigment,
  15-30% by weight lead-free frit,
  20-45% by weight vehicle material,
in which the three components constitute a total 100% by weight.

In a further embodiment, the components are in the following ranges:
  42-52% by weight pigment,
  15-28% by weight lead-free frit,
  25-40% by weight vehicle material.

In a still further embodiment, the components are in the following ranges:
  40-45% by weight pigment,
  17-25% by weight lead-free frit,
  29-38% by weight vehicle material.

The binding material can be a glass enamel frit with low melting point. Its thermal expansion coefficient must suit the thermal expansion coefficient of soft glass bulbs and it must be suitable in case of borosilicate glass bulbs as well. The top value of the range of burning-in temperature must be as far from the softening point of glass material of bulbs as the quantity of heat arising at marking the bulbs must not cause any bulb deformation.

The organic or inorganic vehicle material must not be poisonous either in state of liquid or gas, and must be suitable for preparing homogeneous and lump-free paste. It must not cause any changes in the consistency of finished paste during manufacturing and storing of the paste through either evaporation or chemical reactions. In addition, it must not damage the structural unit, to which the paste is applied. In case of rubber stamp, it must not damage the material of stamp mat. Furthermore, the vehicle material must evaporate and burn completely while burning in the marking. If the base is water, then other additive materials need to be suitable for the requirements mentioned above.

The vehicle material meeting the requirements listed above may be at least one member selected from the group of
  organic liquid,
  water,
  additive.

The vehicle material may preferably be one member selected from the following group:
- 100% by weight glycerin,
- 95% by weight glycerin, and 5% by weight water,
- 90% by weight glycerin, and 10% by weight water,
- 85% by weight glycerin, and 15% by weight water.

The organic liquid may be at least one member selected from the following group:
- glycerin,
- castor oil,
- rapeseed oil,
- synthetic oil,
- mineral oil.

The additive may be at least one member selected from the group of
- surface active material,
- flux,
- anti-foaming agent.

The pigment can be selected from at least one member of the group of inorganic oxide and metal that turns into a color compound upon heating. These metals are known for a person skilled in the art.

The inorganic oxide may be at least one member selected from the following group:
- silver oxide,
- titanium dioxide,
- manganous oxide,
- iron oxide,
- copper oxide.

The pigment comprises the following components:
- 50-90% by weight silver oxide,
- 10-20% by weight iron oxide,
- 10-20% by weight titanium dioxide.

or
- 75-85% by weight silver oxide,
- 10-15% by weight iron oxide,
- 10-15% by weight titanium dioxide.

The components of the pigment constitute a total 100% by weight in both cases.

The preferably used frit is lead-, cadmium- and chromium-free. The thermal expansion coefficient is $86\text{--}90 \times 10^{-7} \, K^{-1}$, its domain of burning in temperature is 440-510° C. The value of thermal expansion coefficient suits the thermal expansion coefficients of soft glass bulbs perfectly and is also suitable for the borosilicate glass. The highest burning in temperature must be as far from the softening point of glass material of bulbs as the quantity of heat arising at marking the bulbs must not cause any bulb deformation.

One ink composition suitable for marking light sources is made of the materials mentioned above within the following concentration ranges:
- 35-45% by weight silver oxide,
- 15-25% by weight lead-free frit,
- 30-40% by weight glycerin, in which the components constitute a total 100% by weight.

Experimental stamp ink pastes were produced in laboratory as described in the following.

EXAMPLE 1

This example is a black marker ink paste. The raw materials were
- silver oxide powder precipitated, washed, sieved and dried,
- lead-free glass enamel frit of type EG 2998,
- glycerin.

The lead-free glass enamel frit of type EG 2998 can be purchased from Ferro Corporation (Cleveland, Ohio, US).

140 grams of silver oxide, 60 grams of EG 2998 frit, and at maximum 100 cubic-centimeters of glycerin were mixed in a mixing bowl. The amount of glycerin was changed in accordance with the desired consistency of the ink paste. The mixing bowl was a so-called mortar with beater made of porcelain.

We mixed up the raw materials in the mixing bowl until a paste-like material came into being. The required time of mixing was about 10 minutes. Subsequently to the mixing operation, the resultant paste-like material was let rest in the mixing bowl while the bowl with the paste-like material was protected from light. We mixed up the paste-like material about one day later, and repeated this operation over 5 consecutive days.

EXAMPLE 2

This example also relates to a black marker ink paste. We used a lead-free glass enamel frit of type EG 2934. This frit has slightly higher silica content and is also available at Ferro Corporation, Cleveland, Ohio, US. Other raw materials and their quantity were identical with those of Example 1. The mixing procedure was also substantially identical.

EXAMPLE 3

This was a colored marker ink paste. The raw materials were
- lead-free decoration color of type Sicocer A Cobalt Blue 558 that can be obtained from BASF AG, Germany;
- lead-free glass enamel frit of type EG 2934;
- glycerin.

| The mixing ratio was the following: | |
| --- | --- |
| Sicocer A Cobalt Blue 558 | 70 grams, |
| EG 2934 frit | 45 grams, |
| Glycerin | 60 cubic-centimeters at maximum in accordance with desirable consistency. |

The time of mixing was about 20 minutes; other operations of the procedure were substantially identical with those of Examples of 1 and 2, respectively.

EXAMPLE 4

This was a black marker ink paste, however water based. The raw materials were
- silver oxide powder precipitated, washed, sieved and dried;
- lead-free glass enamel frit of type EG 2934;
- liquid mixture including;
- 91.5 wt % de-ionized water;
- 8 wt % polyethylene oxide, type Polyox Resin WSRN 3000 made by Dow Chemical Company, (US);
- 0.01 wt % anti-foam additive, type ADDID 880 made by Wacker Chemie GmbH, (Germany);
- 0.4 wt % surface-active additive, type Haloflex 202-S Emulsion made by Avecia Neoresins (Thailand).

40 grams of silver oxide, 14 grams of EG 2934 frit, and at maximum 30 cubic-centimeters of the liquid mixture identified above were mixed in a mixing bowl. The amount of the liquid mixture varied in accordance with the desired consistency of the ink paste. The time of mixing was about 10 minutes. Further steps of the procedure were substantially identical with the operations disclosed in Examples 1, 2 and 3, respectively.

Table 1 below shows a summary of experimentally produced stamp ink pastes of different compositions. The components are silver oxide that was precipitated, washed, dried and sieved; lead-free glass enamel frit of type EG 2998, and glycerin. Their quantity is expressed in percentage by weight. The EG 2998 frit was purchased from Ferro Corporation, (Cleveland, Ohio, US). Of course, this and the previous examples are for illustration only without limiting the scope of the invention.

TABLE 1

| No. of sample | Composition in percent by weight | | |
|---|---|---|---|
| | Silver oxide | EG 2998 frit | Glycerin |
| 1 | 43.4 | 18.6 | 38 |
| 2 | 38.96 | 16.7 | 44.34 |
| 3 | 41.05 | 17.6 | 41.35 |
| 4 | 46.96 | 20.13 | 32.01 |
| 5 | 34.55 | 29.75 | 35.7 |
| 6 | 53.31 | 26.63 | 20.06 |
| 7 | 47.93 | 20.79 | 30.68 |
| 8 | 50.77 | 21.75 | 27.47 |

The invention claimed is:

1. An ink composition for marking glass and ceramic surfaces, and for burning in said surfaces at an elevated temperature, the ink composition comprising the following components:
   35-55% by weight pigment,
   15-30% by weight lead-free frit,
   20-45% by weight vehicle material, wherein the vehicle material is one of glycerin or a mixture of glycerin and water,
   and the components constituting a total 100% by weight.

2. The ink composition of claim 1, in which the temperature of burning in is in the range of 440-510° C.

3. The ink composition of claim 1, in which the composition comprises the following components:
   42-52% by weight pigment,
   15-28% by weight lead-free frit,
   25-40% by weight vehicle material,
   and the components constitute a total 100% by weight.

4. The ink composition of claim 1, in which the composition comprises the following components:
   40-45% by weight pigment,
   17-25% by weight lead-free frit,
   29-38% by weight vehicle material,
   and the components constitute a total 100% by weight.

5. The ink composition of claim 1, in which the pigment is at least one member selected from the following group:
   inorganic oxide,
   metal which turns into a color compound upon heating.

6. The ink composition of claim 5, in which the inorganic oxide is at least one member selected from the group of
   silver oxide,
   titanium dioxide,
   manganous oxide,
   iron oxide,
   copper oxide.

7. The ink composition of claim 1, in which the pigment comprises the following components:
   50-90% by weight silver oxide,
   10-20% by weight iron oxide,
   10-20% by weight titanium dioxide,
   and the components constitute a total 100% by weight.

8. The ink composition of claim 7, in which the pigment comprises the following components:
   75-85% by weight silver oxide,
   10-15% by weight iron oxide,
   10-15% by weight titanium dioxide,
   and the components constitute a total 100% by weight.

9. An ink composition for marking glass and ceramic surfaces, and for burning in said surfaces at an elevated temperature, the ink composition comprising the following components: 35-55% by weight pigment, 15-30% by weight lead-free frit, 20-45% by weight vehicle material in which the vehicle material is one member selected from the following group: 100% by weight glycerin, 95% by weight glycerin, and 5% by weight water, 90% by weight glycerin, and 10% by weight water, 85% by weight glycerin, and 15% by weight waters, and the components constituting a total 100% by weight.

10. An ink composition for marking glass and ceramic surfaces, and for burning in said surfaces at an elevated temperature, in which the composition comprises the following components: 35-45% by weight silver oxide, 15-25% by weight lead-free frit, 30-40% by weight glycerin, and the components constitute a total 100% by weight.

11. The ink composition of claim 1, in which the composition is capable of burning in at an elevated temperature provided by exposure of the glass and ceramic surface to flame.

12. The ink composition of claim 1, in which the composition is a material of paste-like consistency.

13. The ink composition of claim 9, in which the temperature of burning in is in the range of 440-510° C.

14. The ink composition of claim 9, in which the pigment is at least one member selected from the following group:
   inorganic oxide,
   metal which turns into a color compound upon heating.

15. The ink composition of claim 9, in which the inorganic oxide is at least one member selected from the group of:
   silver oxide
   titanium dioxide
   manganous oxide
   iron oxide
   copper oxide.

16. The ink composition of claim 9, in which the composition is capable of burning in at an elevated temperature provided by exposure of the glass and ceramic surface to flame.

17. The ink composition of claim 9, in which the composition is a material of paste-like consistency.

18. The ink composition of claim 10, in which the temperature of burning in is in the range of 440-510° C.

19. The ink composition of claim 10, in which the composition is a material of paste-like consistency.

* * * * *